(12) United States Patent
Rousset et al.

(10) Patent No.: US 11,784,484 B2
(45) Date of Patent: Oct. 10, 2023

(54) ELECTROMECHANICAL SWITCHING DEVICE OF AN ELECTRIC POWER CIRCUIT

(71) Applicant: Airbus Operations SAS, Toulouse (FR)

(72) Inventors: David Rousset, Toulouse (FR); Jean-Marc Lacoste, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 31 days.

(21) Appl. No.: 17/550,947

(22) Filed: Dec. 14, 2021

(65) Prior Publication Data
US 2022/0190584 A1    Jun. 16, 2022

(30) Foreign Application Priority Data
Dec. 16, 2020    (FR) ........................................ 2013313

(51) Int. Cl.
| H01H 47/00 | (2006.01) |
| H02H 3/08 | (2006.01) |
| B64D 31/00 | (2006.01) |
| H02H 1/00 | (2006.01) |

(52) U.S. Cl.
CPC ............... *H02H 3/08* (2013.01); *B64D 31/00* (2013.01); *H02H 1/0007* (2013.01)

(58) Field of Classification Search
CPC ......... H02H 3/08; H02H 1/0007; B64D 31/00
USPC ...................................................... 361/143
See application file for complete search history.

(56) References Cited

U.S. PATENT DOCUMENTS

2014/0250909 A1* 9/2014 Sowden ............... F02N 11/0866
                                                            60/778
2018/0069411 A1* 3/2018 Kim ......................... B60L 3/04

FOREIGN PATENT DOCUMENTS

| DE | 4244118 C1 | | 3/1994 |
| DE | 10 2014 203424 | * | 2/2014 |
| DE | 102014203424 A1 | | 9/2015 |
| EP | 2270829 A | | 1/2011 |
| EP | 2210262 B1 | | 10/2015 |
| JP | 2010218694 A | | 9/2010 |

OTHER PUBLICATIONS

French Search Report; priority document.

* cited by examiner

*Primary Examiner* — Jared Fureman
*Assistant Examiner* — Lucy M Thomas
(74) *Attorney, Agent, or Firm* — Greer, Burns & Crain, Ltd.

(57) ABSTRACT

A switching device including at least one main breaker, an actuator configured to cause a change of state of the main breaker, from a first to a second state, counter to a spring generated force, the actuator being powered by a control signal equal to a first level to cause the change of state of the main breaker then to a second, lower level, to hold the main breaker in the second state. The switching device comprises a current sensor configured to control the control signal to increase it to a third level higher than the second level if the current flowing in the main breaker is higher than or equal to a given operating threshold, to avoid a spurious change of state of the main breaker. The switching device comprises a re-armable protection system for controlling the time for which the control signal is held at the third level.

5 Claims, 2 Drawing Sheets

ELECTROMECHANICAL SWITCHING DEVICE OF AN ELECTRIC POWER CIRCUIT

CROSS-REFERENCES TO RELATED APPLICATIONS

This application claims the benefit of the French patent application No. 2013313 filed on Dec. 16, 2020, the entire disclosures of which are incorporated herein by way of reference.

FIELD OF THE INVENTION

The present application relates to a device for electromechanical switching of a power electrical circuit.

BACKGROUND OF THE INVENTION

According to one embodiment shown in FIG. 1, a device 10 for switching a power electrical circuit comprises:
- at least one main breaker 12 configured so as to occupy an open state in which it isolates an electrical source 14 and an electrical load 16 of the power electrical circuit and also a closed state in which it connects the electrical source 14 and the electrical load 16,
- a coil 18 configured so as to cause the main breaker 12 to be closed and to be held in the closed state when the coil 18 is powered,
- a spring 20 configured so as to cause the main breaker 12 to be opened and to be held in the open state when the coil 18 is no longer powered,
- a control power supply 22 configured for applying a control signal Sc to the first and second end terminals 18.1, 18.2 of the coil 18 upon receiving a signal 24 and maintaining this control signal Sc for as long as the main breaker 12 must remain in the closed state.

The spring 20 is chosen in such a manner that a holding force exerted by the coil 18 in order to keep it compressed is less than a switching force exerted by the coil 18 so as to cause its compression.

Thus, when the main breaker 12 is in the closed state, the force exerted by the coil 18 is reduced by virtue of the removal of the power supply from a part of the coil 18 or of a reduction of the current flowing in it for example.

According to one embodiment described in FIG. 1 and in the document EP2210262, the switching device 10 comprises a circuit connecting an intermediate terminal 18.3 of the coil 18 and the second end terminal 18.2 of the coil 18, said circuit comprising an auxiliary breaker 26 configured so as to occupy alternately open and closed states controlled by the coil 18 together with a re-armable current limiting system 28, the main and auxiliary breakers 12, 26 being configured so as to switch simultaneously.

The principle of operation is as follows:

When the control power supply 22 applies a control signal Sc, since the re-armable current limiting system 28 has a minimal resistance, the current flows in the part of the coil 18 situated between the first end terminal 18.1 and the intermediate terminal 18.3 and reaches the second end terminal 18.2 of the coil 18 via the auxiliary breaker 26 and the re-armable current limiting system 28. The value of the control signal Sc is adjusted so that the coil 18 exerts a switching force sufficient to cause a simultaneous switching of the main and auxiliary breakers 12, 26 into the closed state and into the open state, respectively. Accordingly, after a certain period of time t1, the level of the control signal Sc is reduced, as illustrated in FIG. 2, the coil exerting a holding force lower than the switching force. Thus, the control signal Sc has a first level S1, of around 6 to 7 amps, so as to cause the switching of the main breaker 12 then a second level S2, lower than first level S1, so as to hold it in the closed state.

The re-armable current limiting system 28 is configured so as to have a minimum resistance for as long as the current flowing in it is lower than a given threshold, to have a maximum resistance when the current flowing in it is higher than the given threshold for a given period of time and to return to the minimum resistance as soon as the current flowing in it falls back below the given threshold. This re-armable current limiting system 28 allows a malfunction of the auxiliary breaker 26, which might not open, to be overcome.

In order to obtain a compact and light assembly, the coil 18 is generally designed to generate a switching force for a limited period of time.

The existing electromechanical switching devices are designed for voltages of the order of 115 V for the power electrical circuit, lower than 300 V, and are not designed for higher voltages, of the order of 1000 V. At these voltages, short-circuit currents reaching several kiloamps may appear and generate "levitation" phenomena which tend to initiate the opening of the main breaker 12 despite the action of the coil 18. This unwanted opening of the main breaker 12 causes electric arcs which may lead to its partial or total degradation.

The document DE102014203424 provides a switching device comprising at least one main breaker, connecting batteries and a load, configured so as to occupy first and second states isolating or connecting the batteries and the load. The switching device also comprises a spring, a control power supply and also an actuator configured so as to cause a change from the first state to the second state of the main breaker counter to a force generated by the spring when the actuator is powered by a control signal generated by the control power supply equal to a first level, the spring being arranged so as to cause a change from the second state to the first state of the main breaker when the actuator is not powered, the control power supply being configured so that the control signal is equal to the first level for a given first period of time counting from the receipt of a first signal then to a second level, lower than the first level, so as to hold the main breaker in the second state for as long as the main breaker has to be held in the second state.

According to this document DE102014203424, when the control signal is at a second level, the control power supply is configured for increasing the level of the control signal to a third level for a given period of time in order to avoid "levitation" phenomena.

However, this solution is not optimal since the passage from the second level to the third level and the time during which the control signal is held at the third level are not optimized.

SUMMARY OF THE INVENTION

The present invention aims to overcome all or part of the drawbacks of the prior art.

For this purpose, one subject of the invention is a switching device comprising at least one main breaker together with an upstream section and a downstream section of a power electrical circuit positioned on either side of the main breaker, this main breaker being configured so as to occupy first and second states isolating or connecting the upstream and downstream sections. The switching device also comprises a spring, a control power supply together with an actuator configured so as to cause a change from the first state to the second state of the main breaker counter to a force generated by the spring when the actuator is powered by a control signal generated by the control power supply equal to a first level, the spring being arranged so as to cause a change from the second state to the first state of the main breaker when the actuator is not powered, the control power supply being configured so that the control signal is equal to the first level for a given first period of time counting from the receipt of a first signal then to a second level, lower than the first level, so as to hold the main breaker in the second state for as long as the main breaker has to be held in the second state, the control power supply being configured so that the control signal applied to the actuator is equal to a third level, higher than the second level, upon receiving a second signal, the control signal being held at the third level for a given second period of time or for as long as the current flowing in the main breaker exceeds the given operating threshold.

According to the invention, the switching device comprises at least one current sensor configured for transmitting the second signal to the control power supply if a current flowing in the main breaker exceeds a given operating threshold. As a complement, the switching device comprises a re-armable protection system configured for interrupting the second signal after the second period of time, this re-armable protection system being configured so as to occupy a closed state in which it lets the second signal pass when the latter has a value lower than a given triggering threshold, and also an open state in which it interrupts the second signal whenever the latter has a value higher than or equal to the given triggering threshold for the given second period of time, the re-armable protection system returning to the closed state when the second signal is once again lower than the given triggering threshold.

The invention allows a spurious change of state of the main breaker to be avoided in the presence of high short-circuit currents, of the order of several kiloamps, by temporarily increasing the force generated by the actuator when the current sensor detects a current higher than or equal to the given operating threshold. In addition, the re-armable protection system allows the time for which the control signal is held at the third level to be controlled in a simple manner.

According to another feature, the second signal has a value of zero when the current flowing in the current sensor is lower than the operating threshold and a setpoint value greater than zero when the current flowing in the current sensor is higher than or equal to the operating threshold, the given triggering threshold being slightly below the setpoint value of the second signal.

According to another feature, the current sensor is positioned in the downstream section, just after the main breaker.

According to another feature, the third level is higher than or equal to the first level.

Another subject of the invention is an aircraft comprising a power electrical circuit comprising at least one switching device according to one of the preceding features.

BRIEF DESCRIPTION OF THE DRAWINGS

Other features and advantages will become apparent from the description of the invention that follows, which description is given solely by way of example, with reference to the appended drawing amongst which.

DETAILED DESCRIPTION OF THE PREFERRED EMBODIMENTS

Figure 1:
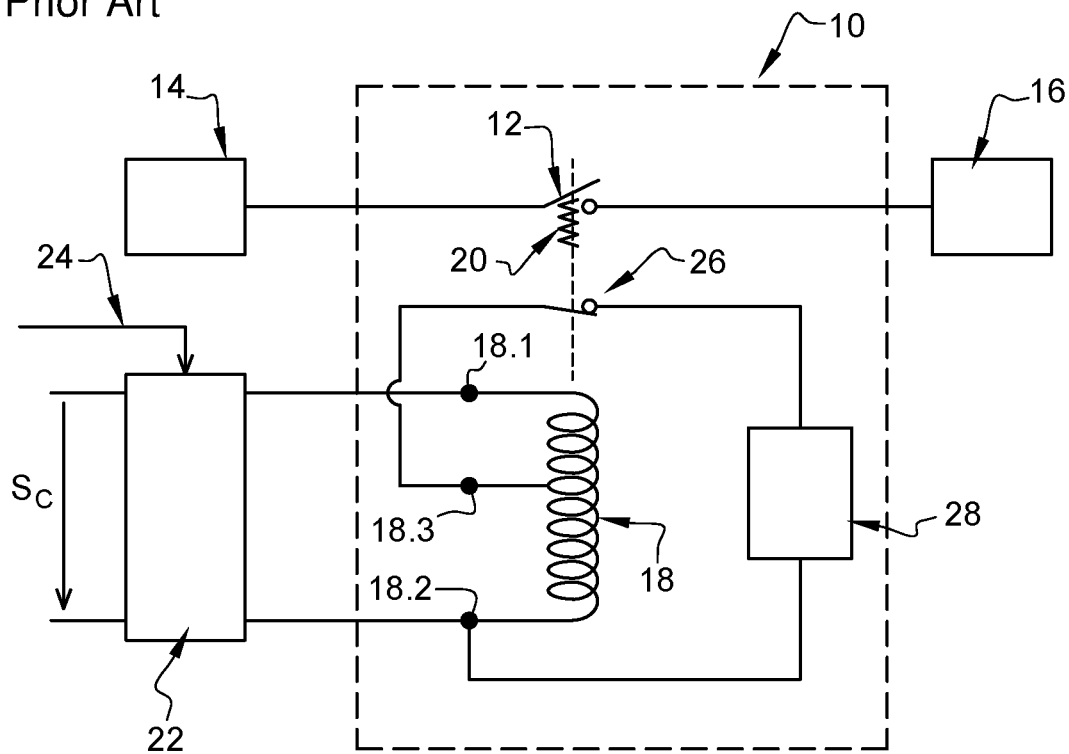
FIG. 1 is a circuit diagram of a switching device for a power electrical circuit illustrating one embodiment of the prior art.
Figure 2:
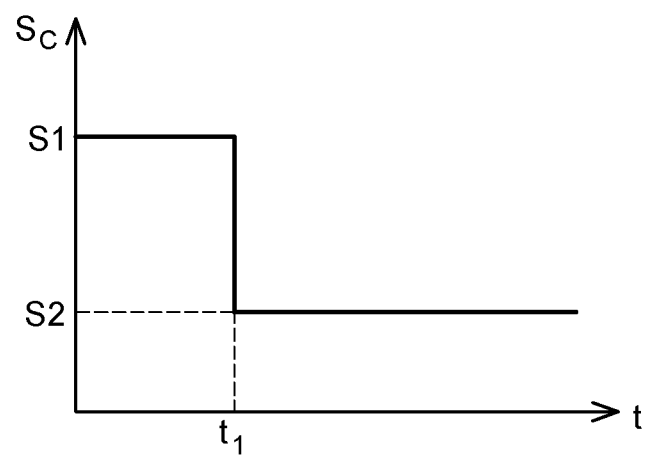
FIG. 2 is a diagram showing a control signal as a function of time illustrating one mode of operation of the prior art.
Figure 3:
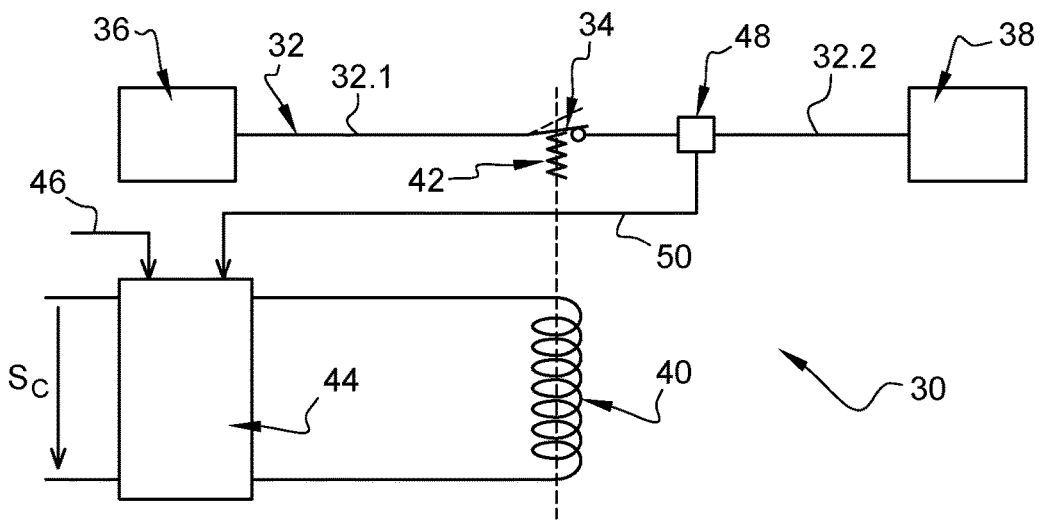
FIG. 3 is a circuit diagram of a switching device for a power electrical circuit illustrating one embodiment of the invention.

In FIG. 3, a switching device 30 for a power electrical circuit 32 comprises at least one main breaker 34 together with an upstream section 32.1 and a downstream section 32.2 of the power electrical circuit 32 positioned on either side of the main breaker 34. The main breaker 34 is configured so as to occupy an open state, also called first state (shown with a dashed line), in which it isolates the upstream section 32.1 from the downstream section 32.2 and prohibits the flow of a current, together with a closed state also called second state, in which it connects the upstream and downstream sections 32.1, 32.2 and allows a current to flow. According to one non-limiting application, the main breaker 34 is used to connect or to isolate at least one electrical source 36 and at least one electrical load 38 within a power electrical circuit of an aircraft. The main breaker 34 is configured so as to operate at high voltages, higher than 300 V, of the order of 1000 V. It goes without saying that it could operate at lower voltages of the order of 115 V.

In operation, a nominal current not exceeding an operating threshold of the order of several hundred amps flows in the power electrical circuit 32. Under certain circumstances, a short-circuit current exceeding the operating threshold, of the order of several kiloamps, may flow in the power electrical circuit 32.

The switching device 30 comprises:

An actuator 40 configured so as to cause the main breaker 34 to close and it to be held in the closed state when the actuator is powered, a spring 42 configured so as to cause the main breaker 34 to open and it to be held in the open state when the actuator 40 is no longer powered, a control power supply 44 configured for applying a control signal Sc to the actuator 40 upon receiving a first signal 46 and holding this control signal Sc for as long as the main breaker 34 has to remain in the closed state.

The control signal Sc may be an energy, a voltage, a current or any other physical quantity.

According to one embodiment, the actuator 40 is a coil comprising first and second end terminals to which the control signal Sc is applied.

Irrespective of the embodiment, the actuator 40 is configured so as to cause a change from a first state (or open state) to a second state (or closed state) of the main breaker 34 counter to a force generated by the spring 42 when the actuator 40 is powered by a control signal Sc having a first level S1, the spring 42 causing a change from the second state to the first state of the main breaker 34 when the actuator 40 is not powered.

According to one embodiment, the spring 42 is configured in such a manner that a holding force exerted by the actuator 40 for keeping it compressed is less than a switching force exerted by the actuator 40 so as to cause its compression.

Thus, the actuator 40, driven by the control signal Sc to a first level S1, exerts a switching force so as to cause a change of state of the main breaker 34 greater than a holding force of the main breaker 34 in a given state when the actuator 40 is driven by the control signal Sc to a second level S2 lower than the first level S1.

Figure 4:
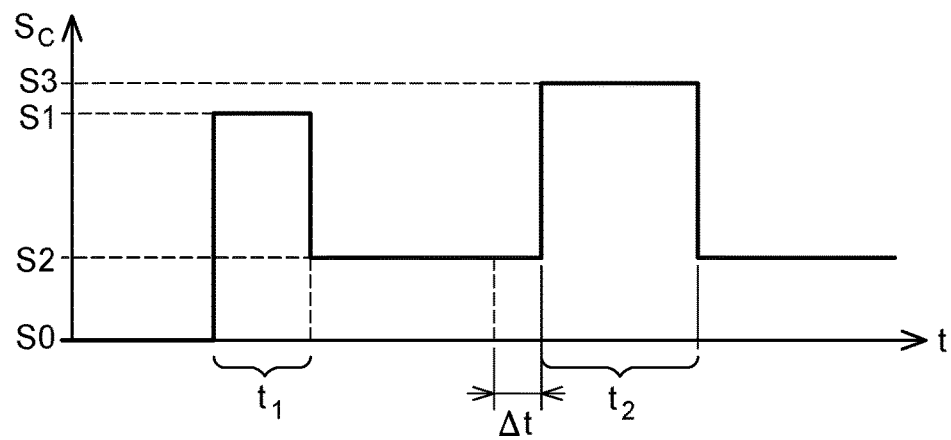
FIG. 4 is a diagram showing a control signal as a function of time illustrating one mode of operation of the invention.

As illustrated in FIG. 4, the control power supply 44 is configured so as to generate a control signal Sc equal to:

a first level S1 for a given first period of time t1 counting from the receipt of the first signal 46 so as to cause a change of state of the main breaker 34 (going from the open state to the closed state), a second level S2, lower than the first level S1, for holding the main breaker 34 in a given state (closed state) for as long as the main breaker 34 has to be held in the given state.

As described in the document EP2210262, the control power supply 44 may comprise a control circuit connecting an intermediate terminal of the coil and the second end terminal of the coil, said control circuit comprising an auxiliary breaker configured so as to occupy alternately open and closed states controlled by the coil together with a re-armable current limiting system, the main and auxiliary breakers being configured for switching simultaneously.

The switching device 30 comprises at least one current sensor 48, positioned in the upstream section 32.1 or the downstream section 32.2 of the power electrical circuit 32, configured for issuing a second signal 50 to the control power supply 44 if a current flowing in the main breaker 34 exceeds a given operating threshold. As a complement, the control power supply 44 is configured for generating a control signal Sc equal to a third level S3 higher than the second level S2 applied to the actuator 40, upon receiving the second signal 50 generated by the current sensor 48. According to one configuration, the third level S3 is higher than or equal to the first level S1.

The second signal 50 has a value of zero when the current flowing in the current sensor 48 is lower than the operating threshold and a setpoint value greater than 0 when the current flowing in the current sensor 48 is higher than or equal to the operating threshold.

According to one configuration, the current sensor 48 is positioned in the downstream section 32.2 just after the main breaker 34. Irrespective of the arrangement, the current sensor 48 is positioned in such a manner that it has the same current flowing through it as the main breaker 34.

In the presence of several main breakers 34, the switching device may comprise several current sensors 48, one for each main breaker 34.

As illustrated in FIG. 4, there is a delay Δt between the moment of detection of the short-circuit current exceeding the operating threshold and the moment when the control signal Sc goes from the second level S2 to the third level S3.

The control signal Sc is held at the third level S3 for a given second period of time t2 or for as long as the short-circuit current exceeds the given operating threshold.

According to one embodiment, the control power supply 44 comprises a timer allowing the control signal Sc to be held at the third level S3 for the given second period of time t2 and to be reduced to the second level S2 after this given second period of time t2.

Figure 5:
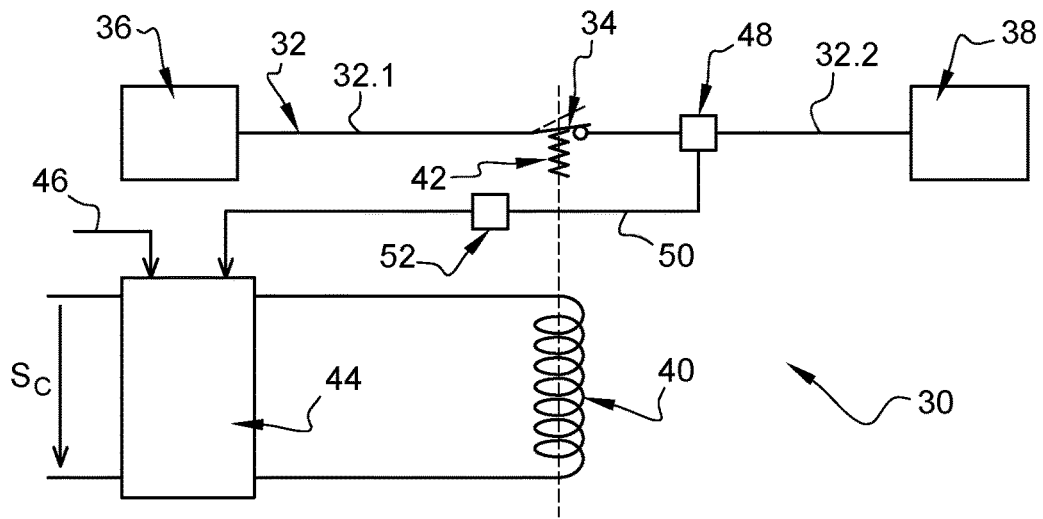
FIG. 5 is a circuit diagram of a switching device for a power electrical circuit illustrating one embodiment of the invention.

According to one feature of the invention shown in FIG. 5, the switching device 30 comprises a shutdown system 52 configured for interrupting the second signal 50 after the second period of time t2 in order for the control signal Sc generated by the control power supply 44 to go from the third level S3 to the second level S2 after the given second period of time t2. According to one configuration, the shutdown system 52 is a re-armable protection system (for example, a resettable fuse), as illustrated in the document EP2210262, for example. This re-armable protection system is configured so as to occupy a closed state and let the second signal 50 pass when the latter has a value lower than a given triggering threshold, together with an open state to interrupt the second signal 50 whenever the latter has a value higher than or equal to the given triggering threshold for the given second period of time t2, this re-armable protection system returning to the closed state when the second signal 50 is once again lower than the given triggering threshold. This given triggering threshold is slightly below the setpoint value of the second signal 50. Thus, in the absence of the second signal 50, the re-armable protection system is in the closed state. As soon as the current sensor 48 generates a second signal 50 with a setpoint value greater than the given triggering threshold, the re-armable protection system remains in the closed state for the given second period of time t2 then automatically goes into the open state with the result that the control power supply 44 no longer receives the second signal 50. Thus, for as long as the control power supply 44 receives the second signal 50, it generates a control signal equal to the third level S3 higher than or equal to the first level S1. As soon as the control power supply 44 no longer receives the second signal 50, it generates a control signal equal to the second level S2 lower than the first and third levels S1, S3.

The invention allows the "levitation" phenomena in the presence of high short-circuit currents, of the order of several kiloamps, to be avoided by temporarily increasing the force generated by the actuator 40 when the current sensor 48 detects a current higher than a given operating threshold. The embodiment shown in FIG. 5 allows the time for which the control signal Sc is held at the third level S3 to be controlled in a simple manner.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A switching device comprising:
    at least one main breaker together with an upstream section and a downstream section of a power electrical circuit positioned on either side of the main breaker, said main breaker being configured to occupy first and second states isolating or connecting the upstream and downstream sections,
    a spring,
    a control power supply together with an actuator configured to cause a change from the first state to the second state of the main breaker counter to a force generated by the spring when the actuator is powered by a control signal generated by the control power supply equal to a first level, the spring being arranged to cause a change from the second state to the first state of the main breaker when the actuator is not powered, the control power supply being configured so that the control signal is equal to the first level for a given first period of time counting from receipt of a first signal then to a second level, lower than the first level, to hold the main breaker in the second state for as long as the main breaker has to be held in the second state, the control power supply being configured so that the control signal applied to the actuator is equal to a third level higher than the second level, upon receiving a second signal, wherein the control signal is held at the third level for a given second period of time or for as long as current flowing in the main breaker exceeds a given operating threshold, wherein the switching device comprises at least one current sensor configured to transmit the second signal to the control power supply if the current flowing in the main breaker exceeds the given operating threshold, wherein the switching device comprises a re-armable protection system located between the current sensor and the control power supply, wherein the re-armable protection system is configured for interrupting the second signal to the control power supply after the second period of time, said re-armable protection system being configured so as to occupy a closed state in which the closed state lets the second signal pass when the latter has a value lower than the given triggering threshold, together with an open state in which the open state interrupts the second signal whenever the second signal has a value higher than or equal to the given triggering threshold for the given second period of time, said re-armable protection system returning to the closed state when the second signal is once again lower than the given triggering threshold.

2. The switching device as claimed in claim 1, wherein the second signal has a value of zero when the current flowing in the current sensor is lower than the given operating threshold and a setpoint value greater than zero when the current flowing in the current sensor is higher than or equal to the given operating threshold, the given triggering threshold being slightly below the setpoint value of the second signal.

3. The switching device as claimed in claim 1, wherein the current sensor is positioned in the downstream section just after the main breaker.

4. The switching device as claimed in claim 1, wherein the third level is higher than or equal to the first level.

5. An aircraft comprising a power electrical circuit comprising at least one switching device as claimed in claim 1.

* * * * *